US011385877B1

(12) United States Patent
Steavenson et al.

(10) Patent No.: US 11,385,877 B1
(45) Date of Patent: Jul. 12, 2022

(54) DEPLOYING APPLICATIONS

(71) Applicant: MICROSOFT TECHNOLOGY LICENSING, LLC, Redmond, WA (US)

(72) Inventors: Thomas Steavenson, Islington (GB); Andrew Munro Caldwell, London (GB); Thomas Paul Whiteway, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/133,240

(22) Filed: Dec. 23, 2020

(30) Foreign Application Priority Data

Nov. 13, 2020 (GB) ...................................... 2017948

(51) Int. Cl.
 *G06F 8/60* (2018.01)
 *G06F 16/901* (2019.01)
 *G06F 8/41* (2018.01)
(52) U.S. Cl.
 CPC .................. *G06F 8/60* (2013.01); *G06F 8/41* (2013.01); *G06F 16/9024* (2019.01)
(58) Field of Classification Search
 CPC ........... G06F 8/60; G06F 16/9024; G06F 8/41
 See application file for complete search history.

(56) References Cited

U.S. PATENT DOCUMENTS

| | | | |
|---|---|---|---|
| 8,261,295 B1 | 9/2012 | Risbood et al. | |
| 10,241,770 B2 | 3/2019 | Risbood et al. | |
| 10,581,675 B1* | 3/2020 | Iyer | G06F 8/71 |
| 10,708,135 B1 | 7/2020 | Elliott, IV | |
| 10,841,152 B1* | 11/2020 | Humphreys | G06F 9/45558 |
| 11,074,091 B1* | 7/2021 | Nayakbomman | G06F 8/65 |
| 11,093,227 B1* | 8/2021 | Shteyman | G06F 8/60 |
| 11,150,895 B1* | 10/2021 | Wall | G06F 8/71 |
| 2013/0232463 A1* | 9/2013 | Nagaraja | G06F 8/61 717/101 |
| 2013/0232498 A1* | 9/2013 | Mangtani | G06F 9/5038 718/104 |

(Continued)

FOREIGN PATENT DOCUMENTS

| | | |
|---|---|---|
| CN | 110851145 A | 2/2020 |
| CN | 111309441 A | 6/2020 |

OTHER PUBLICATIONS

Vayghan et al., "Deploying Microservice Based Applications with Kubernetes: Experiments and Lessons Learned" (Year: 2018).*

(Continued)

*Primary Examiner* — Phillip H Nguyen
(74) *Attorney, Agent, or Firm* — Newport IP, LLC; Han K. Gim (57) ABSTRACT

A method for deploying an application at a cluster of cloud nodes comprises receiving a component defining the deployment of the application at the cluster of cloud nodes, the component recursively defining a first graph of other components. A component has a mapping from an interface of the component to an interface of any component referenced in the component. The method comprises compiling the received component into instructions for input to an orchestrator of the cluster of cloud nodes; and sending the instructions to the orchestrator to trigger deployment of the application.

20 Claims, 9 Drawing Sheets

(56) References Cited

U.S. PATENT DOCUMENTS

| | | | | |
|---|---|---|---|---|
| 2017/0134301 | A1* | 5/2017 | Chen | ........................ H04L 67/10 |
| 2019/0303212 | A1* | 10/2019 | Bosch | ............... H04W 36/0038 |
| 2020/0228402 | A1 | 7/2020 | Parker | |

OTHER PUBLICATIONS

"Build on Kubernetes with confidence", Retrieved from: https://web.archive.org/web/20201031153336/https://carvel.dev/, Oct. 31, 2020, 3 Pages.

"Draft-Streamlined Kubernetes Development", https://web.archive.org/web/20201008033214/https://draft.sh/, Retrieved from: Oct. 8, 2020, 6 pages.

"Gravitational", Retrieved from: https://goteleport.com/gravity/docs/, Retrieved Date: Sep. 30, 2020, 14 Pages.

"Productivity for teams building Kubernetes apps", Retrieved from: http://web.archive.org/web/20201031220312/https://tilt.dev/, Oct. 31, 2020, 9 Pages.

"Semantic Versioning 2.0.0", Retrieved from: https://semver.org/, Retrieved Date: Sep. 30, 2020, 2018, 10 Pages.

"Skaffold", Retrieved from: http://web.archive.org/web/20201019080148/https://skaffold.dev/, Oct. 19, 2020, 2 Pages.

"Tanka Posts", Retrieved from: https://grafana.com/categories/tanka/, Retrieved on: Sep. 30, 2020, 3 Pages.

"The Automation Platform for Cloud Native Applications", Retrieved from: https://garden.io/, Retrieved Date: Sep. 30, 2020, 11 Pages.

"What you Git is what you get!", Retrieved from: http://web.archive.org/web/20201010052821/https://werf.io/, Oct. 10, 2020, 9 Pages.

"Working with chart dependencies", Retrieved from: https://web.archive.org/web/20201025230216/https://werf.io/documentation/advanced/helm/working_with_chart_dependencies.html, Oct. 25, 2020, 3 Pages.

Hawkins, Adam, "Deploying Kubernetes Applications with Helm", Retrieved from: https://cloudacademy.com/blog/deploying-kubernetes-applications-with-helm/, Mar. 9, 2017, 7 Pages.

Tawfik, Mohamed, "Kubernetes Deployment with Helm Charts", Retrieved from: https://www.magalix.com/blog/kubernetes-deployment-with-helm-charts, Jul. 19, 2020, 16 Pages.

Ibryam, et al., "Kubernetes Patterns: Reusable Elements for Designing Cloud-Native Applications", In Publication of O'Reilly Media, Apr. 4, 2019, 266 Pages.

"International Search Report and Written Opinion Issued in PCT Application No. PCT/US21/052487", dated Jan. 21, 2022, 10 Pages.

* cited by examiner

DEPLOYING APPLICATIONS

CROSS-REFERENCE TO RELATED APPLICATION(S)

This non-provisional utility application claims priority to UK patent application number 2017948.7 entitled "DEPLOYING APPLICATIONS" and filed on Nov. 13, 2020, which is incorporated herein in its entirety by reference.

BACKGROUND

Cloud computing is the delivery of computing services such as servers, storage, databases, networking, software, analytics and intelligence over the Internet and/or other communications networks such as an intranet or private cloud. The term "cloud" is used to refer to the internet and/or a private communications network. Cloud computing brings many benefits from the point of view of users of cloud computing services including end users who use the services and enterprises which provide the services. Benefits include flexibility and economies of scale.

Often an enterprise or organization deploys an application in the cloud in order to make the application available to end users as a service. End user equipment is able to access the application functionality by sending requests via a communications network to the application in the cloud and receiving responses.

Deploying an application in the cloud as a cloud service is not straightforward because there are many factors to take into account. Achieving a stable deployment which is robust, efficient and secure is often challenging.

In some cases containerized applications are used to facilitate deployments of applications in the cloud. A container is a standalone, executable package of software that includes everything needed to run an application. Deploying containerized applications simplifies the deployment process since once a container is added to a web server or other cloud computing node, that node has everything needed to execute the application. Technologies used to develop containerized applications are often referred to as cloud-native technologies since they are designed to create software suitable for deploying to the cloud. Containerized applications are often deployed by decomposing the application into a plurality of microservices and deploying the microservices separately. A micro service is a single function module with a well-defined interface that is independently deployable and operable.

The embodiments described below are not limited to implementations which solve any or all of the disadvantages of known apparatus and methods for deploying applications.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer implemented method for deploying an application at a cluster of cloud nodes. The method comprises receiving a component defining the deployment of the application at the cluster of cloud nodes, the component recursively defining a first graph of other components. A component has a mapping from an interface of the component to an interface of any component referenced in the component. The method comprises compiling the received component into instructions for input to an orchestrator of the cluster of cloud nodes; and sending the instructions to the orchestrator to trigger deployment of the application.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
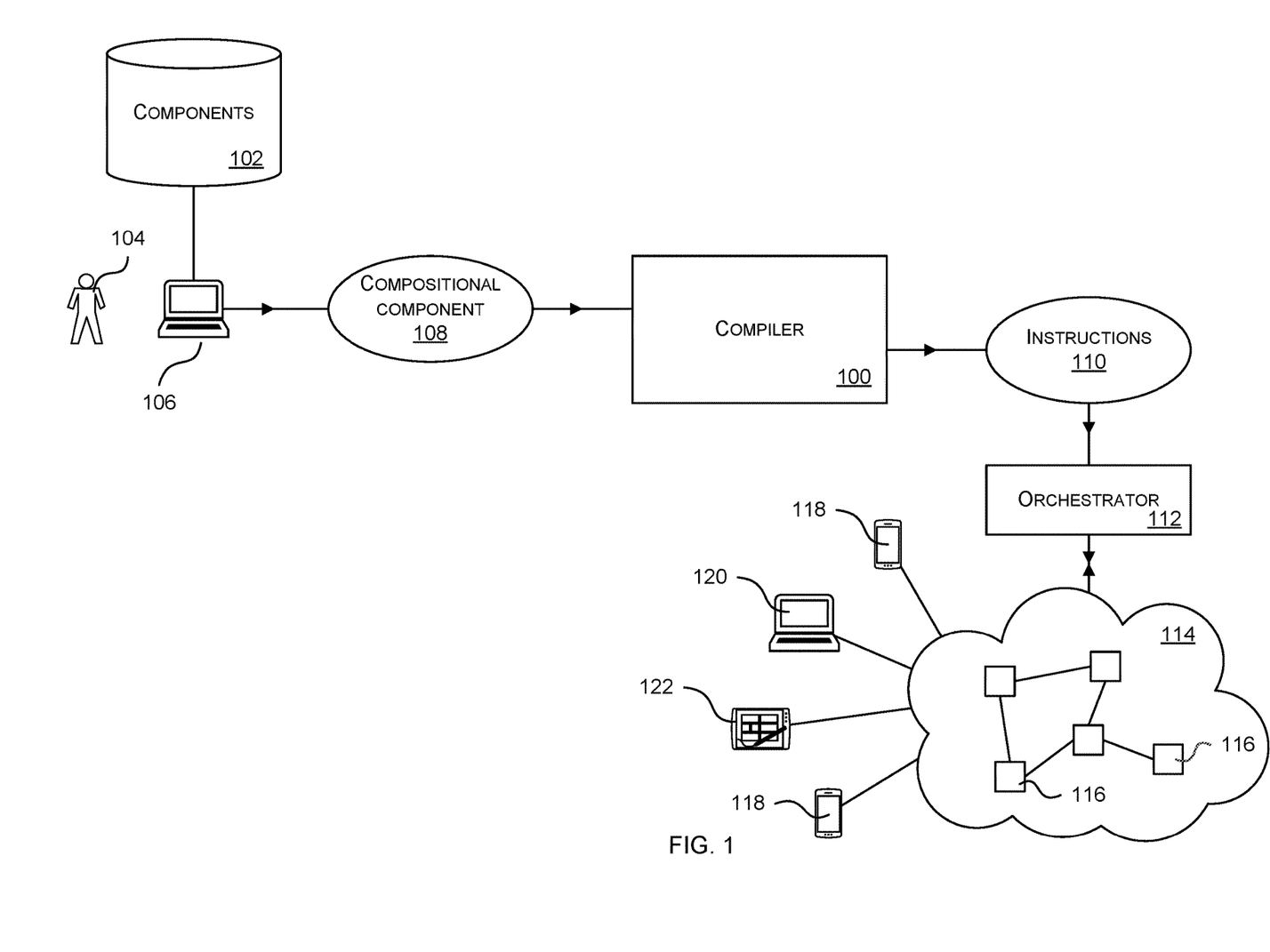
FIG. 1 is a schematic diagram of a compiler for compiling a compositional component into instructions for input to an orchestrator of a cluster of cloud nodes in order to deploy an application in the cluster.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples FIG. 1 is a schematic diagram of a compiler 100 for compiling a compositional component 108 into instructions 110 for input to an orchestrator 112 of a cluster 114 of cloud nodes 116 in order to deploy an application in the cluster 114. The compositional component 108 defines a deployment of the application and because of the compositional nature of the component significant benefits are achieved, including efficiency and accuracy of application deployment as explained in more detail below.

A component is software comprising an interface for receiving messages and sending responses. A component has one or more expressions which have concrete values and/or a reference to another component. A component also has a mapping as explained in more detail with reference to FIGS. 2 and 2A.

A store of components 102 is optionally available. In some cases the components in the store have associated version numbers.

An operator 104 using a computer 106 creates a compositional component 108 which defines a deployment of an application which it is desired to deploy in the cluster 114 of cloud nodes. The operator 104 creates the compositional component 108 manually and optionally by including in the compositional component references to one or more other components from store 102. The operator 104 is able to include references within components to other components in a recursive manner in order to create compositional component 108. In this way the operator 104 is able to re-use components from previous deployments of the same or other applications. Individual components in store 102 are thought of as similar to building blocks used to create a compositional component 108 defining a desired deployment. However, unlike simple building blocks a component also has a quality referred to as "config mapping" which facilitates accurate and efficient application deployment. The term "config mapping" is explained in detail with reference to FIG. 2; briefly "config mapping" is where a component has a mapping from an interface of the component to an interface of any component referenced in the component. A component hides an interface of any component it references as a result of the mapping.

The compiler 100 compiles the compositional component 108 into instructions 110 which are suitable for input to an orchestrator 112. In an example the instructions 110 are in the form of Helm charts although any cloud native instructions 110 are usable. An orchestrator is a management node of the cluster 114. The orchestrator has an interface to receive instructions 110 and deploy an application in the cluster 114 according to the instructions. In an example the orchestrator is implemented using Kubernetes, but it is not essential to use Kubernetes; any software for automating computer application deployment, scaling, and management is used to implement the orchestrator. In an example, the instructions 110 are relatively "flat" in nature since they are provided in a programming language, such as Helm or another cloud native language, which has not been designed with compositionality in mind. The compiler is able to understand the compositional nature of the input it receives in order to properly make the output that it generates.

Once the instructions 110 are received at the orchestrator 112 the orchestrator executes the instructions 110 in order to deploy the application in the cluster 114. After deployment the application is available as a service to one or more client devices such as smart phones 118, laptop computers 120, tablet computers 122 and others.

The compositional component 108 has one or more dependencies as explained with reference to FIG. 2A below. In various examples the compiler implements one or more of: dependency resolution, dependency tracking, dependency updating. Further benefits in terms of accuracy and efficiency of application deployment are thereby achieved as explained in more detail below.

The compiler of the disclosure operates in an unconventional manner to achieve efficiency and accuracy of application deployment.

The compiler improves the functioning of the underlying computer system by enabling compositional components to be used to deploy applications in cloud clusters.

Using compositional components means that there is no need to redefine how to deploy a component of a solution each time it appears in a deployment. Also, the definition of an individual component can be tested when it is defined, and confidence can be carried into the next stage of composition. It is possible to produce a range of application deployments, that can be customized to particular needs at a much greater rate, and with vastly increased confidence of quality, than if trying to produce the same application deployment outcome with existing technology. Using the compiler, an operator is able to define the desired cloud native instructions in a well typed manner, avoiding maintainability issues of writing Helm charts. Benefits are achieved because the components are compilable into forms suitable for different types of orchestrators. In this way the components are reused even where the orchestrator is different from an orchestrator previously used with the component. Reusing components between orchestrators is found to bring improvements in robustness and efficiency.

Alternatives may be considered, such as adding the ability to have compositionality into the programming language of the compiled instructions 110. However, such an alternative is not well suited to the orchestrator; many existing orchestrators only operate with compiled instructions of a particular form. To have compositionality in the programming language of the compiled instructions would mean significant changes, both to that programming language and existing orchestrators. Such an alternative is more complex from the point of view of the operator 104 who finds it less burdensome to deal with components as in the present disclosure.

Figure 2:
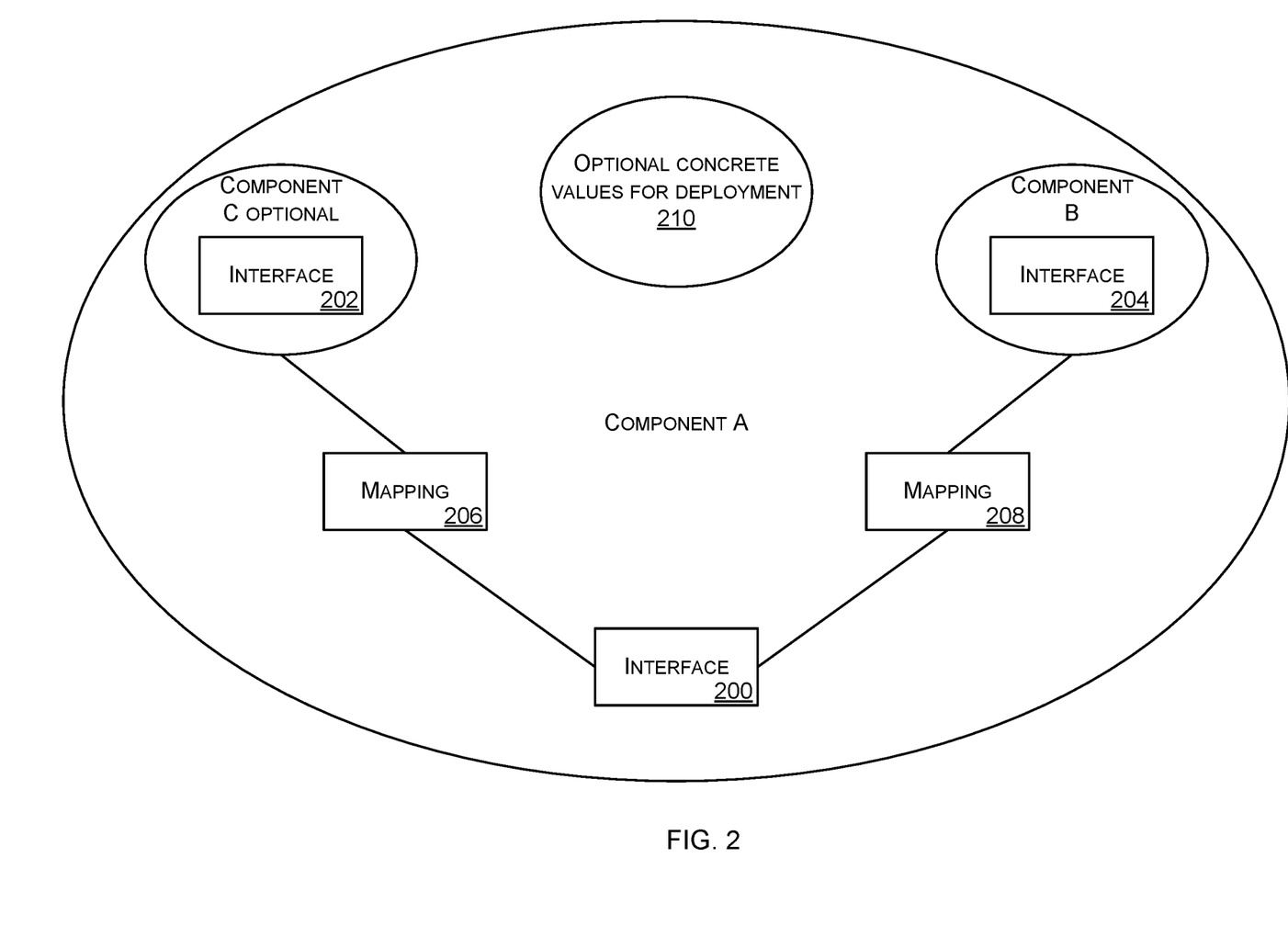
FIG. 2 is a schematic diagram of a component.

FIG. 2 is a schematic diagram of a component referred to as component A. Component A is compositional since it contains component B by virtue of having a reference to component B. Component B is itself compositional in some cases. Component A in this example contains another component, component C by having a reference to component C. However, note that component A contains one or more other components and in this example, only two other components are shown for clarity. In other examples there are many more components within component A. Component C is itself compositional in some cases.

Component A has optional concrete values for deployment 210. These are expressions which have concrete values and do not reference any other components.

A component is software comprising expressions and including an interface. In the example of FIG. 2 component A has an interface 200 which receives messages incoming to the component and outputs responses. The interface 200 is an application programming interface for example. Component B has interface 204 and component C has interface 202.

In the technology of the present disclosure, a component has "config mapping" functionality which means that an interface of a child component referenced within a parent component is hidden from entities interacting with the parent component. The hiding is achieved by having a mapping in the parent component which maps from the parent component interface to the child component interface. In the example of FIG. 2 parent component A has mapping 208 which maps from parent component A's interface 200 to child component B's interface 204. Parent component A also has mapping 206 which maps from parent component A's interface to child component C's interface.

When components are created by an operator and stored in store 102 of FIG. 1 the appropriate mappings are given in the components to enable config mapping to be enabled.

Figure 2A:
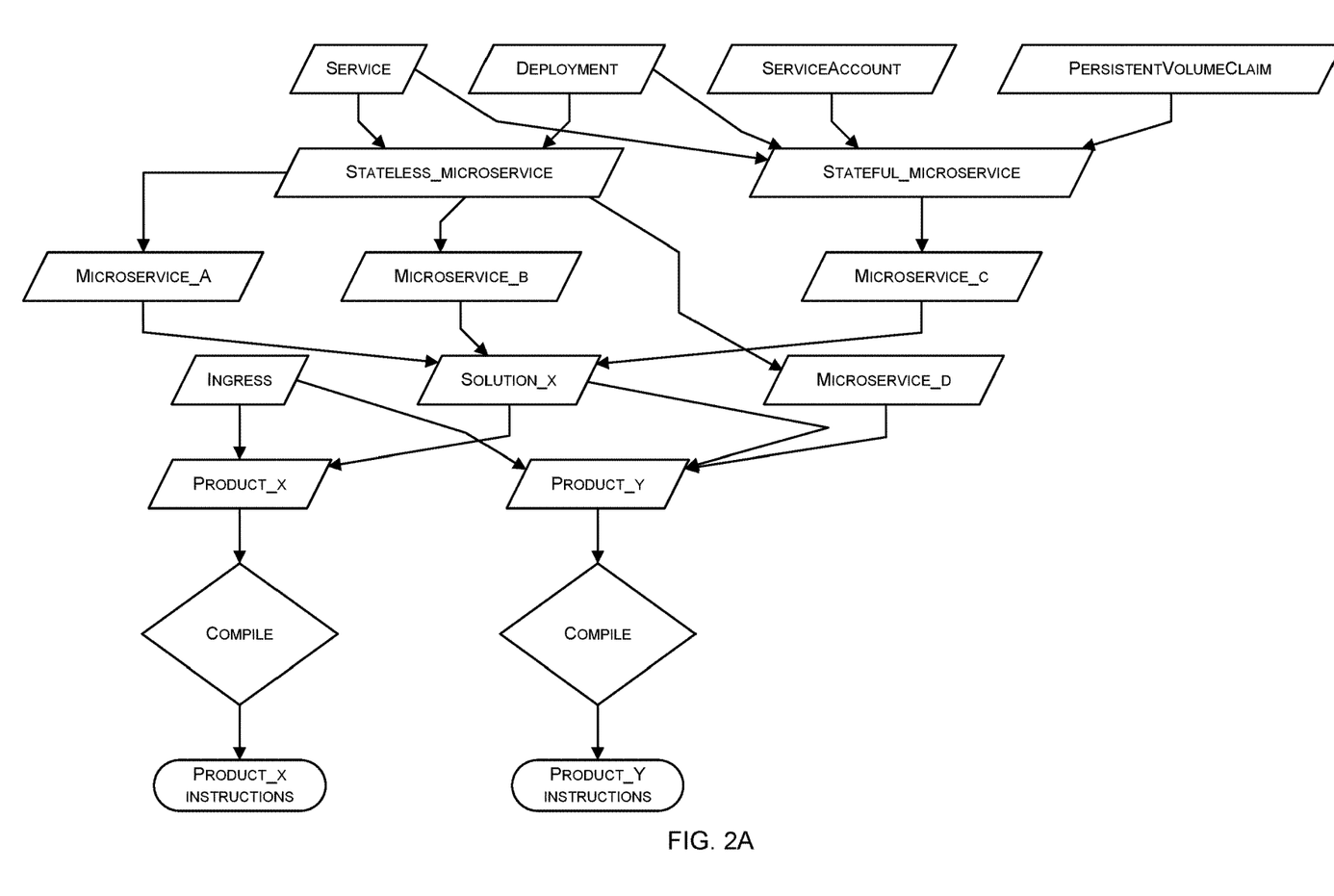
FIG. 2A shows a component for product X and a component for product Y and illustrates a graph.

FIG. 2A shows a component defining a deployment of product Y which enters a compile process (depicted as a diamond shape) to generate instructions referred to as product Y instructions in FIG. 2A which are an example of instructions 110 of FIG. 1. The component defining product Y in FIG. 2A is an example of compositional component 108 of FIG. 1. The component for product Y recursively defines a first graph of other components. The term "recursively defines" means that the component specifies a deployment by referring to one or more components which in turn refer to one or more other components and so on. In the example of FIG. 2A the component defining product Y references three other components since there are three arrows entering the box depicting product Y component. The three other components are: ingress, solution X and microservice D. The solution X component itself references three other components since it has three arrows entering it. Microservice D component references one other component which is stateless microservice. The stateless microservice component references a service component and a deployment component which are examples of atomic objects of the orchestrator and are represented as leaf nodes of a graph, where the component product Y is a root node of the graph. Thus FIG. 2A shows two graphs which have shared sub structure. Each graph is made up of components connected by edges where the edges represent references in parent components referring to child components. A first graph is for deploying product X and has product X component as its root node. A second graph is for deploying product Y and has product Y component as its root node. The first and second graphs share sub-structure since there are components in common between the graphs. For example, the component called solution X is part of the first graph and part of the second graph. The component called microservice B is also part of the first graph and part of the second graph. In this way it is seen that efficiencies and accuracies in deployment are achieved because of the shared sub-structure. If microservice B has successfully been deployed in product X then by re-using the deployment definition for microservice B (i.e. the component of microservice B) in the definition of the deployment of product Y it is possible to ensure accuracy of the deployment of product Y at least in respect of the microservice B aspects. Efficiencies are also gained since the definition of microservice B is re-used.

Any of the components at any level in a graph can be compiled into instructions by using recursion where needed. A component which refers to other components is compiled out of those other components. Any of the other components which refer to still more components are themselves compiled out of those still more components. Each leaf node of a graph represents a component which an atomic unit defined by the orchestrator where an atomic unit is an instruction or group of instructions which can't be sub divided. Note that the service component, deployment component, service account and persistent volume claim leaf nodes in FIG. 2A are examples of atomic objects of an orchestrator and other atomic objects are usable in other examples.

The graphs of FIG. 2A show dependencies between components. In the example of FIG. 2A, product Y and product X are both dependent on microservice B.

Figure 3:
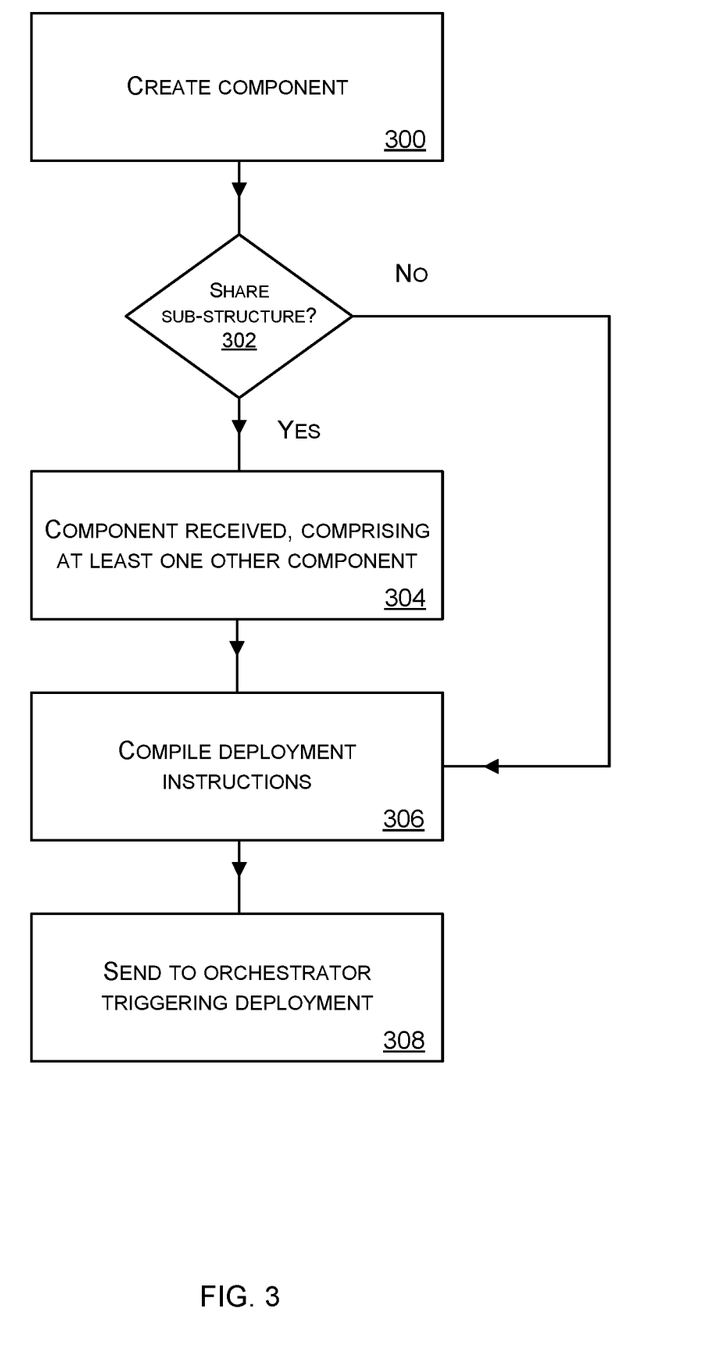
FIG. 3 is a flow diagram of a method of deploying an application.

FIG. 3 is a flow diagram of a method of deploying an application. An operator such as operator 104 of FIG. 1 creates a component 300 defining a deployment of an application to be made in a cluster of cloud nodes. The operator 104 checks 302 whether the component is to share sub-structure or not by checking whether any existing components are to be re-used. If sub-structure is to be shared then the operator 104 includes references in the component, referring to one or more other components. In this way a compositional component 108 is formed which can be represented as a graph such as a graph of the form of FIG. 2A.

The component is received 304 at the compiler 100 of FIG. 1. The component comprises at least one other component by having a reference to at least one other component.

The compiler compiles 306 the component to generate deployment instructions. The compilation process comprises resolving expressions of components until they are redefined in terms of the root node's inputs. The root node's inputs are not necessarily known by the compiler. The deployment instructions are the instructions 110 of FIG. 1. At deploy time, the instructions are sent 308 to the orchestrator which resolves the root node inputs into constant values and triggers deployment of the application in the cluster. The orchestrator has stored information about what constant values to use in place of the respective root node inputs.

In the case that sub-structure is not to be shared the component has no references to other components and the process moves from operation 302 to operation 306.

Figure 4:
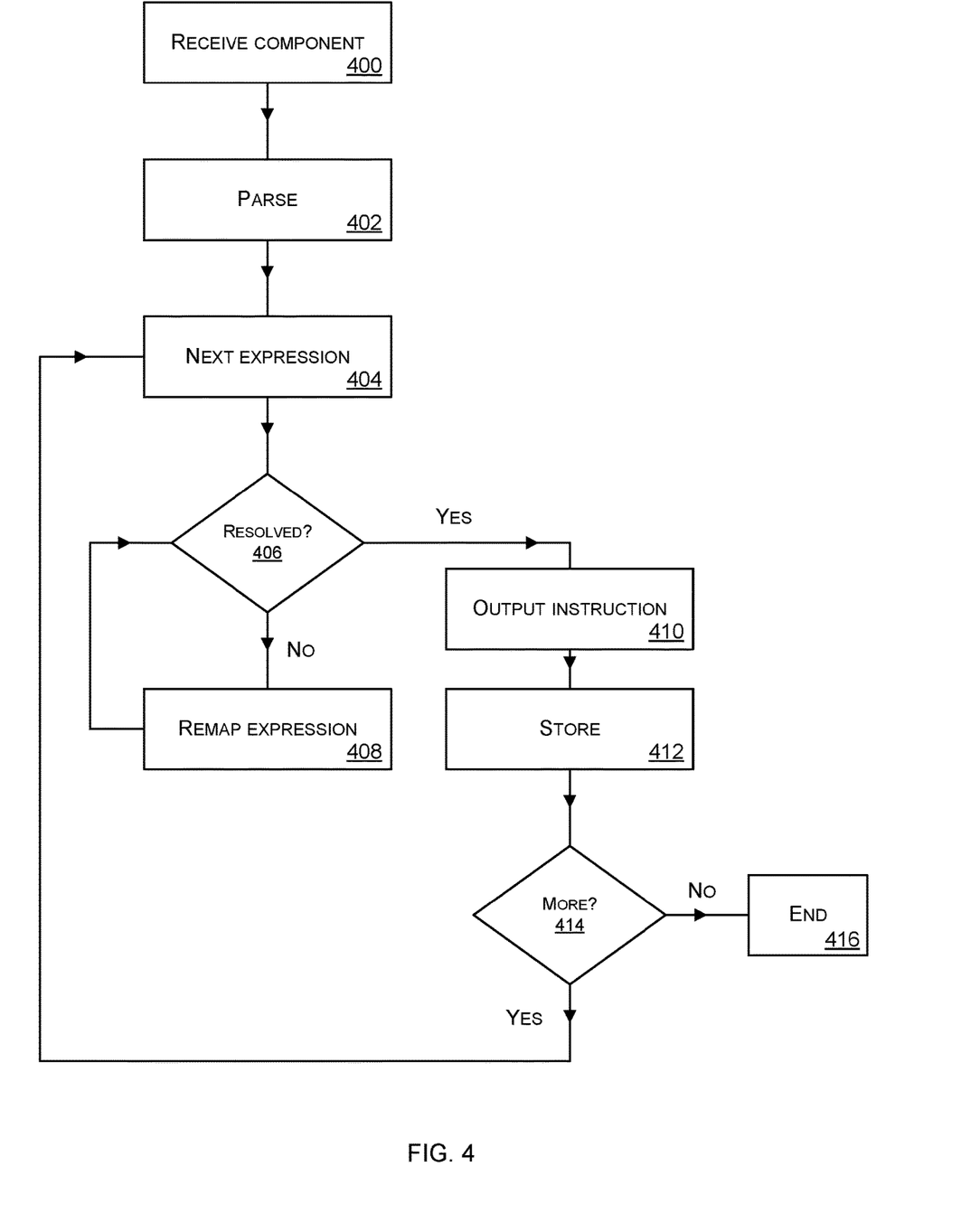
FIG. 4 is a flow diagram of more detail of operation 306 of FIG. 3.

FIG. 4 is a flow diagram of more detail of operation 306 of FIG. 3. The compiler receives 400 a component defining a deployment of an application. The compiler parses 402 expressions of the component and takes a next expression 404 from the output of the parsing. The compiler checks whether the expression is resolvable or not by checking whether the expression comprises a reference to another component or not. If the expression has no reference to another component then it is resolvable, such as where it comprises concrete values. In this case the compiler compiles the expression to generate an output instruction 410 in a cloud native form in terms of the root node's inputs. The output instruction is stored 412 and a check made to see if there are more expressions in the output of the parsing operation 402 which have not yet been processed. If there are no more expressions the process ends 416 and returns to operation 308 of FIG. 3. If there are more expressions the process returns to operation 404.

At operation 406, if the expression has a reference to another component the expression is remapped 408. The remapping involves taking the inputs to the component and remapping them into inputs of the referenced component. The remapping is computed using the mapping that is part of the component. Once the remapping has been computed the expression is checked again at operation 406 to see if it contains a reference to another component. If it does the remapping operation 408 is done and the process returns to operation 406. In this way there is a recursive remapping through the graph until the unresolved expression is resolved in terms of the root node's inputs. Having a recursive remapping process is found to be a particularly efficient way to compile the expressions and generate output instructions which are cloud native. The orchestrator is able to take the cloud native instructions and resolve any root node inputs by replacing them with appropriate constant values. Recursive remapping is also robust since if remapping fails at a point in the process the results from earlier in the process are usable and it is not necessary to start again from scratch. The process depicted in FIG. 4 is referred to as dependency resolution in some cases since the dependencies in the graph are resolved as a result of the recursive remapping.

Generally speaking, when a component refers to another component it's saying "include the expressions from this other component and remap them in terms of my inputs".

Figure 5:
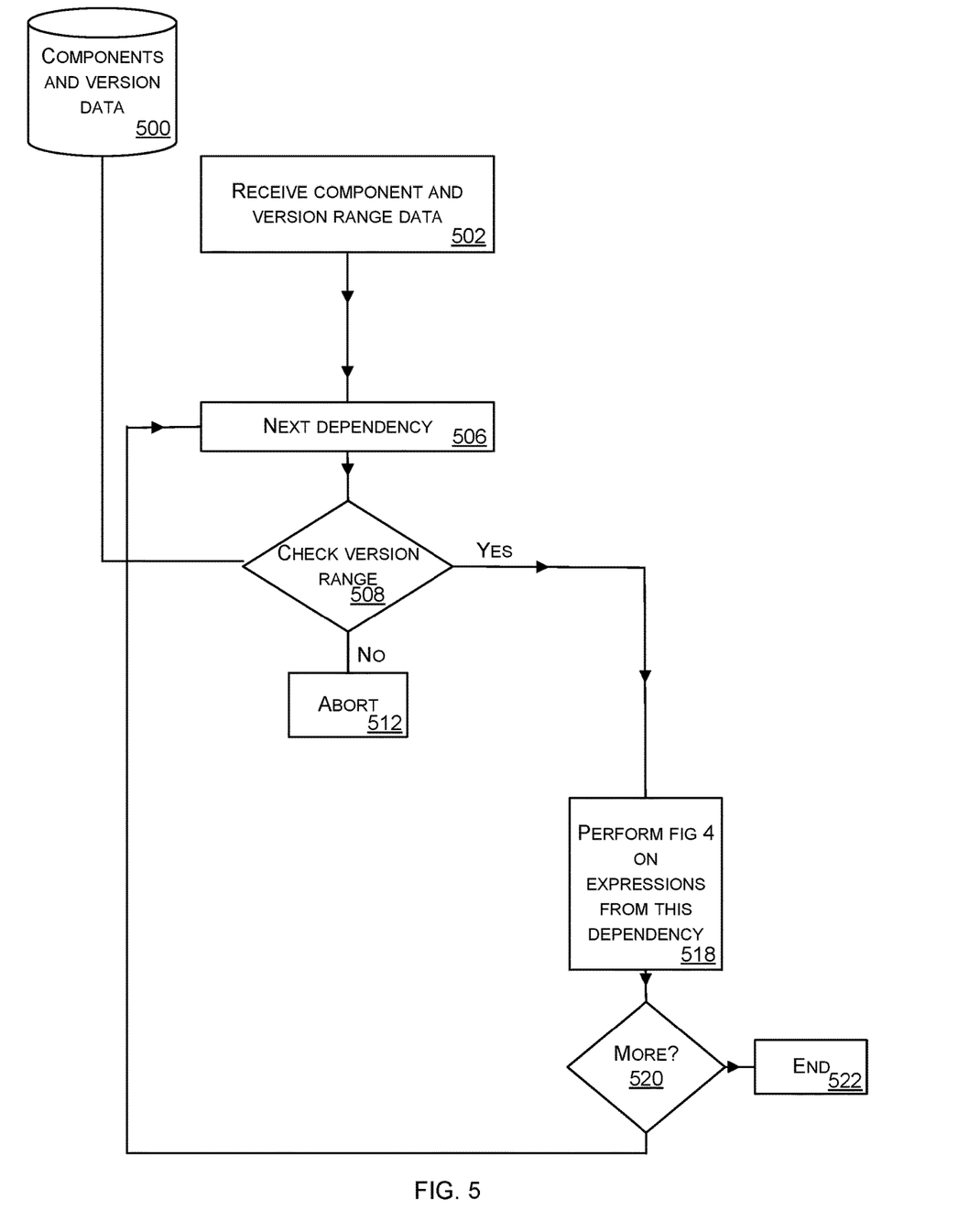
FIG. 5 is a flow diagram of a method of dependency resolution and optional version tracking used in the process of FIG. 4.

FIG. 5 is a flow diagram of a method of dependency resolution and optional version tracking. The process involves finding a version of a dependency that matches a version requirement. If a matching version is found, the dependency is fetched, and the expressions contained within it are remapped. In the example of FIG. 5 there is a store of components (such as the store 102 of FIG. 1) which also comprises version data. Individual components stored in store 102 have associated version numbers according to a version numbering scheme. When the compiler receives a component to be compiled it also receives 502 version range data for the component. The version range data is a range of version numbers for which the deployment specified by the component is valid.

The compiler takes a next dependency 506 from the graph corresponding to the component received at operation 502. The proceeds to check 508 whether a version of a component corresponding to the dependency, obtained from the store 500, is within the received version range received at operation 502. If the version number of the component corresponding to the dependency from the store is outside the received version range then the process aborts 512. If the version number of the component corresponding to the dependency is within the range the check 508 is passed and the compiler proceeds to carry out the process of FIG. 4 (as indicated at 518 in FIG. 5) on expressions from the dependency (i.e. expressions of the component corresponding to the dependency from the store).

A check is made 520 to see if there are more dependencies in the graph. If so the process returns to operation 506. If not the process ends 522.

Using version ranges and version numbers as in the process of FIG. 5 brings improved accuracy of deployments of applications. Even where there are many versions of components and ongoing updates to versions of components it is possible to manage the process of compiling the output instructions 516 in the efficient and accurate manner of FIG. 5. As a result bugs and errors in deployments are avoided since incompatible versions are aborted before being deployed and leading to conflicts and malfunction in the cloud cluster.

Figure 6:
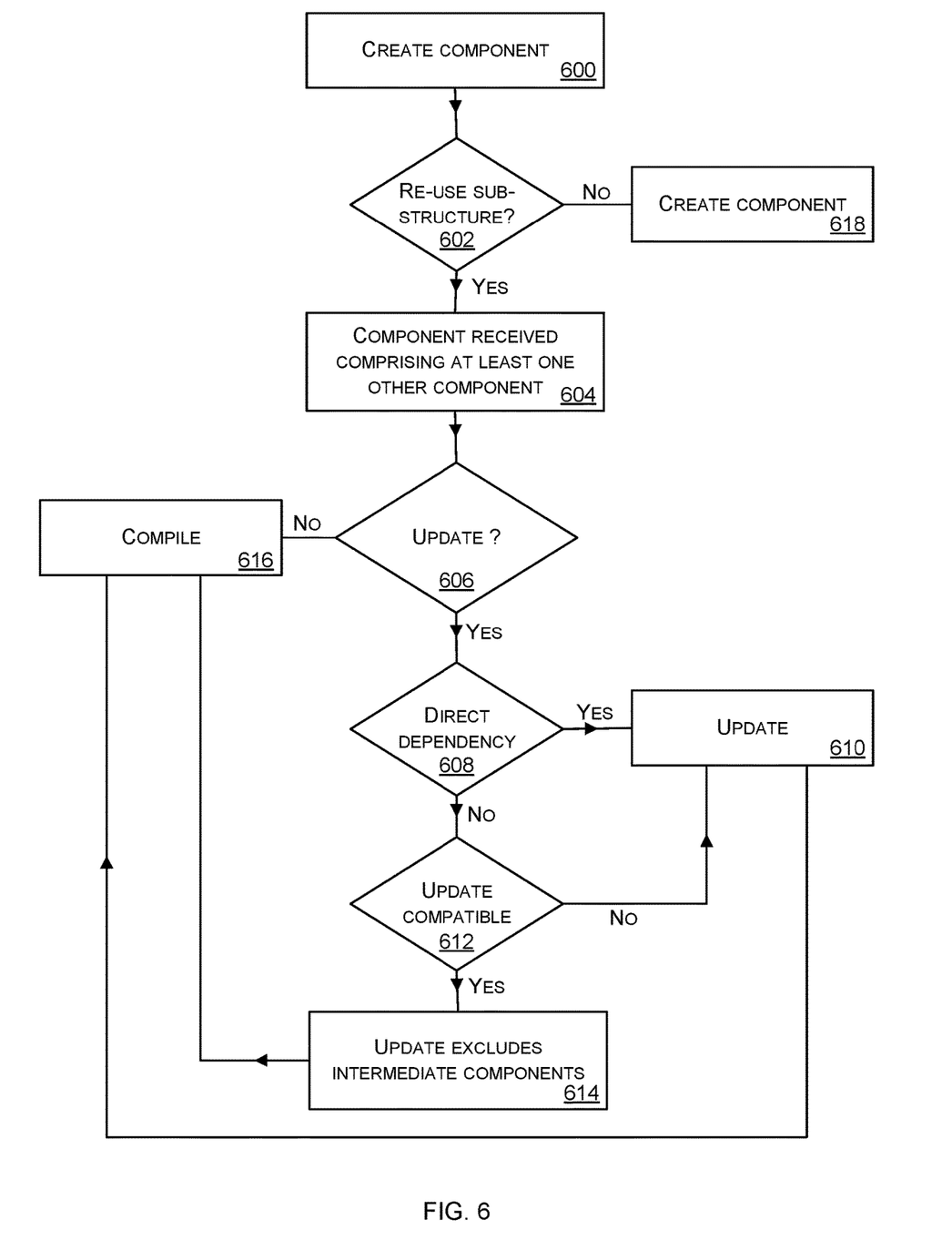
FIG. 6 is a flow diagram of a method of dependency updating used by a compiler such as that of FIG. 1.

FIG. 6 is a flow diagram of a method of dependency updating used by a compiler such as that of FIG. 1. Dependency updating is extremely useful where a component in a graph (such as the graph of FIG. 2A) is to be updated in order to make an update to a deployment of an application. Updates to deployments are often needed for maintenance, resource provisioning and other reasons. Once the update has been done there are typically consequential updates to be made to other components in the graph which depend on the updated component. If the consequential updates are missing the result is often malfunction of the deployed application. However, making updates to all the components in the graph which depend on the updated component is expensive and time consuming. Efficiencies are gained by using a process such as that of FIG. 6 to update some but not all of the components which depend on the updated component. In order to safely and effectively update some but not all of the components which depend on the updated component an analysis of compatibility is made as now explained.

A component is created 600 in the same way as described for operation 300 of FIG. 3. A decision is made at operation 602 whether or not to re-use sub-structure 602 of a graph by re-using components. If not a component is created 618 which defines a deployment of an application without referencing any other components. If re-use is being exploited a component is received 604 which comprises at least one other component. The received component defines a deployment of an application.

A check is made whether an update to a component in a graph is desired, where the graph is a representation of the received component from operation 604. If not the component received at operation 604 is compiled 616 as described earlier in this document and the process returns to operation 306 of FIG. 3.

If an update to a component of the graph is desired then a check 608 is made to see if the new version of the component requires its dependencies (i.e. the components it references) to be updated. In that case, those dependencies are also updated at operation 610.

When a new version of a dependency, which isn't a direct dependency of a definition, is updated to a version compatible with the version range of the component that directly depends on it and makes the declaration of the dependency, an update of intermediate dependencies is not required. Thus in FIG. 6 a check is done at operation 612 to see if the update is compatible or not. Where not compatible an update is carried out at operation 610. Where compatible an update 614 is made which excludes intermediate components and is therefore more efficient than updating all components. In an example, a first graph comprises component A linked to component B linked to component C, and the method comprises receiving an update to component C instructed by component A without an update to component B, where the update to component C is within a version range specified in component B as being compatible for component C. In this case the intermediate component (component B) is not updated and the process continues to compilation operation 616.

In an example, a graph comprises component A linked to component B linked to component C, and the method comprises receiving an update to component B and component C instructed by component A, where the update to component C is outside a version range specified in component B as being compatible for component C. In this case all the components (A, B and C) are updated using operation 610 after which the process moves to compilation operation 616.

Figure 7:
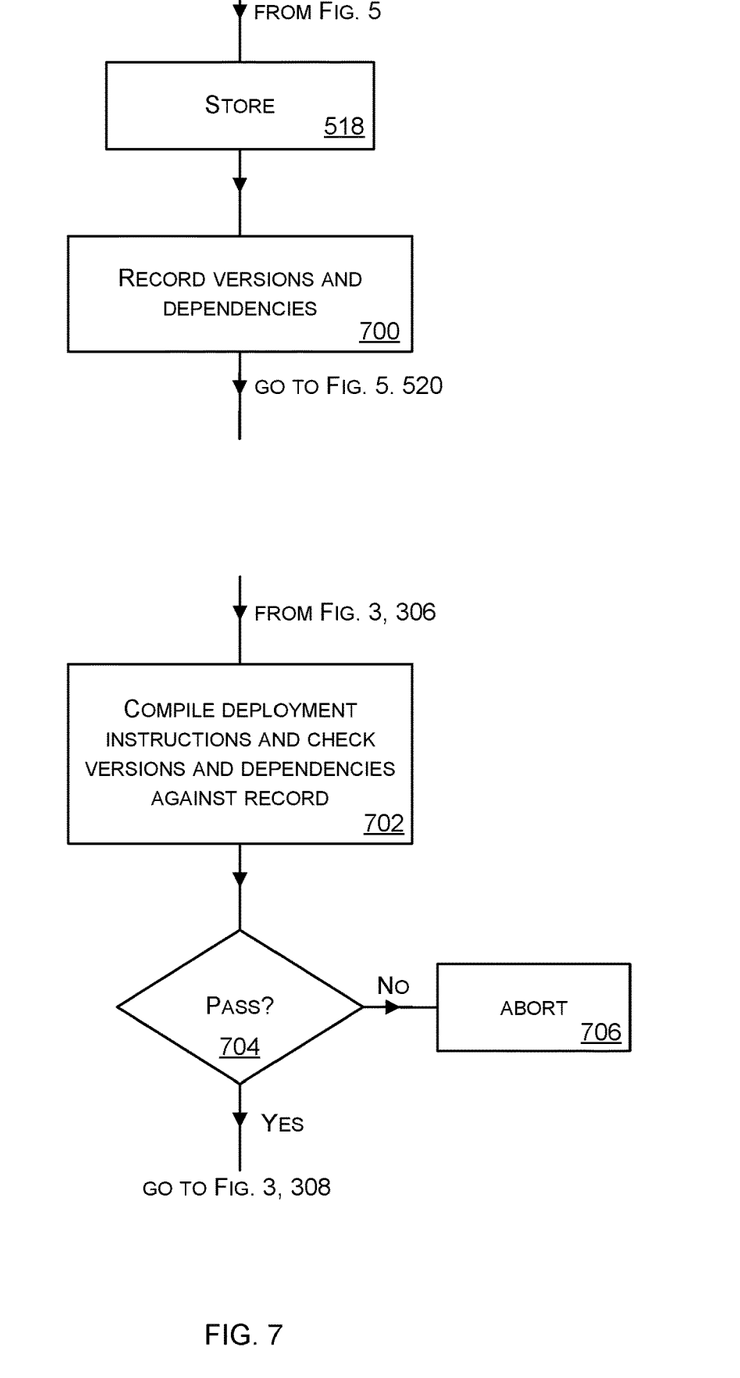
FIG. 7 shows a method of dependency tracking used together with the methods of FIGS. 5 and 3.

FIG. 7 shows a method of dependency tracking used together with the methods of FIGS. 5 and 3. In the process of FIG. 5 the compiled instructions are stored 518 and in the method of FIG. 7 the storing of the compiled instructions is done together the version numbers of the components which were compiled and dependency information of the compiled components. The dependency information is an identifier and version number of a parent component of the compiled component and an identifier and version number of any dependent components of the compiled component (where the dependent components are those in the graph). By storing the dependency resolution outcomes it is possible to compile precisely the same instructions at a later date. In this way it is not essential to store the compiled instructions since the compiled instructions are reliably reproducible using the stored dependency resolution outcomes. In an example the versions are stored using a format of a publicly available schema.

FIG. 7 augments the process of FIG. 3 by adding a version and dependency check 702 as part of the compilation process. The versions and dependencies of the components which are compiled are checked against those in a record previously obtained at operation 700 of FIG. 7. If the check 704 is passed the process returns to operation 308 of FIG. 3. If the check fails the process aborts 706.

Figure 8:
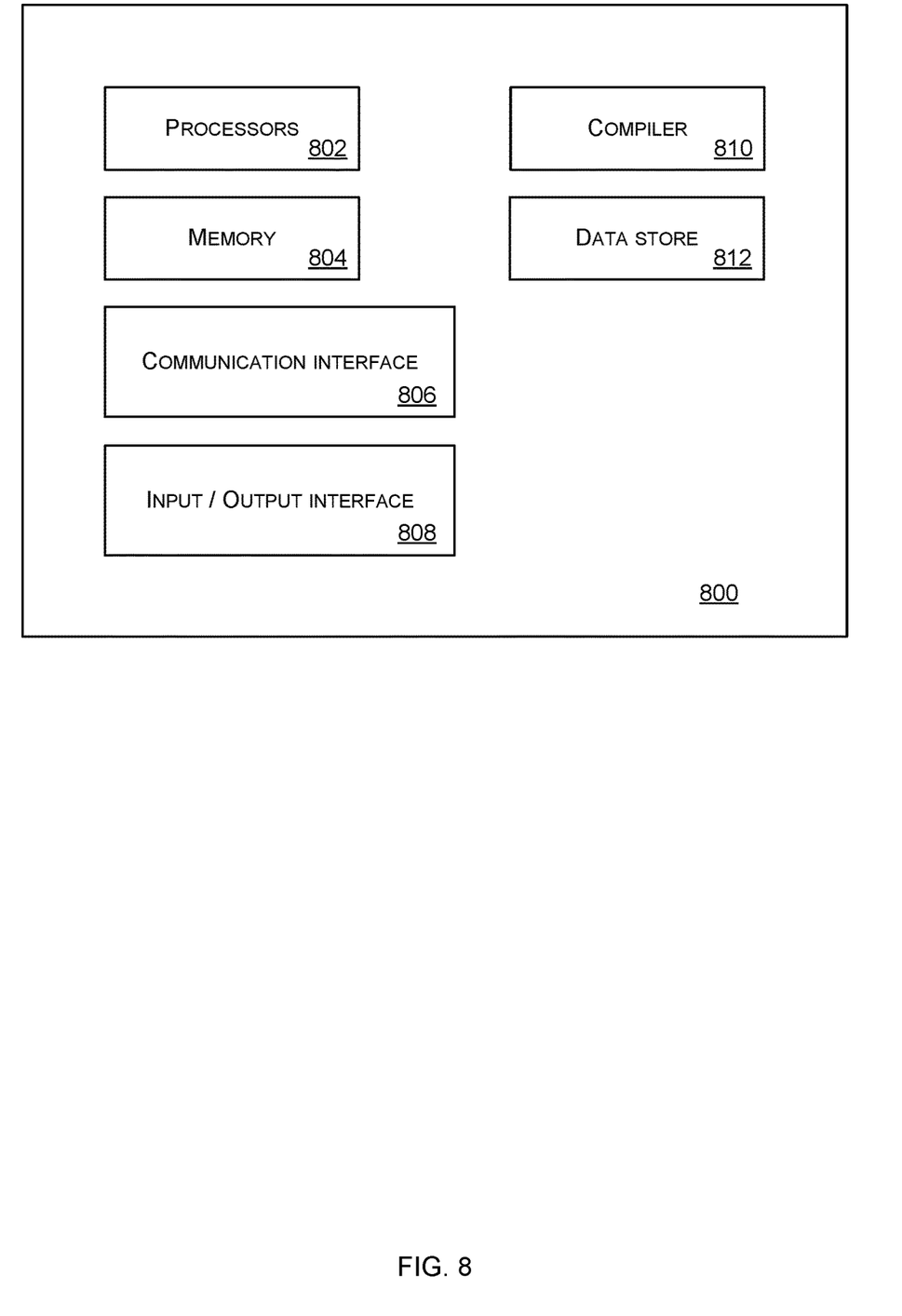
FIG. 8 illustrates an exemplary computing-based device in which embodiments of a compiler such as that of FIG. 1 are implemented.

FIG. 8 illustrates various components of an exemplary computing-based device 800 which is implemented as any form of a computing and/or electronic device, and in which embodiments of the compiler of FIG. 1 is implemented in some examples.

Computing-based device 800 comprises one or more processors 802 which are microprocessors, controllers or any other suitable type of processors for processing computer executable instructions to control the operation of the device in order to compile a compositional component which defines an application deployment into cloud native instructions. In some examples, for example where a system on a chip architecture is used, the processors 802 include one or more fixed function blocks (also referred to as accelerators) which implement a part of the method of the compiler in hardware (rather than software or firmware). Platform software comprising an operating system or any other suitable platform software is provided at the computing-based device to enable compiler 810 to be executed on the device. A data store 812 holds graphs, components, version ranges, compiled instructions and other data.

The computer executable instructions are provided using any computer-readable media that is accessible by computing based device 800. Computer-readable media includes, for example, computer storage media such as memory 804 and communications media. "Computer-readable media" and its variations may also include the term "non-transitory" to further illustrate that signals per se are excluded. Computer storage media, such as memory 804, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 804) is shown within the computing-based device 800 it will be appreciated that the storage is, in some examples, distributed or located remotely and accessed via a network or other communication link (e.g. using communication interface 806). Communication interface 806 is a network card enabling the computing-based device to receive a component to be compiled and to send instructions to an orchestrator.

The computing-based device 800 also comprises an input/output controller 808 arranged to output display information to a display device which may be separate from or integral to the computing-based device. The display information may provide a graphical user interface. The input/output controller 808 is also arranged to receive and process input from one or more devices, such as a user input device (e.g. a mouse, keyboard, camera, microphone or other sensor). In some examples the user input device detects voice input, user gestures or other user actions In an embodiment the display device also acts as the user input device if it is a touch sensitive display device. The input/output controller 808 outputs data to devices other than the display device in some examples.

Alternatively or in addition to the other examples described herein, examples include any combination of the following:

Clause A A computer implemented method for deploying an application at a cluster of cloud nodes the method comprising:
receiving a component defining the deployment of the application at the cluster of cloud nodes, the component recursively defining a first graph of other components, where a component has a mapping from an interface of the component to an interface of any component referenced in the component;
compiling the received component into instructions for input to an orchestrator of the cluster of cloud nodes; and
sending the instructions to the orchestrator to trigger deployment of the application. In this way an efficient and adaptable way of deploying an application is achieved. The ability to recursively define the deployment of the application is found to be accurate and efficient and to give flexibility.

Clause B The method of clause A wherein a component hides an interface of any component it references as a result of the mapping. By hiding interfaces in this way complexity is reduced and there is reduced burden of deploying applications.

Clause C The method of clause A or clause B comprising receiving a second component defining a deployment of a second application at the cluster of cloud nodes, the second component recursively defining a second graph which has one or more nodes in common with the first graph. In this way it is possible to re-use components between deployments so that accuracy and efficiency benefits are achieved.

Clause D The method of clause C comprising compiling the second component into deployment instructions for input to the orchestrator to deploy the second application. This gives an effective and efficient way of using the orchestrator. The instructions for the orchestrator can be in a programming language which is relatively inflexible and does not have significant scope for composability.

Clause E The method of any preceding clause comprising compiling the first component by remapping unresolved expressions of the first graph in a recursive manner using the mappings such that expressions are defined in terms of inputs to a root node of the graph. This gives an efficient way of accurately computing the compilation even where the components are compositional in nature. Using the recursive process enables the compiler to deal with the compositional nature of the component it receives.

Clause F The method of clause E comprising at a root node of the graph, identifying an unresolved expression of a component corresponding to the root node, remapping the unresolved expression using a mapping of the component corresponding to the root node, using the mapped inputs as inputs to a component referenced by the root node and continuing to recursively remap through the graph until the unresolved expression is resolved in terms of inputs to the root node. Recursively remapping enables the compiler to cope with the compositional nature of the component.

Clause G The method of clause E or clause F wherein the first component comprises a range of compatible versions of a component referenced by the first component and wherein the compiler checks a version of the referenced component used during remapping is within the range of compatible versions. Using version checking in this way facilitates accuracy and eliminates bugs and malfunctioning.

Clause H The method of any preceding clause comprising using the compiler to carry out dependency resolution of dependencies in the first graph whereby the dependency is resolved by using version numbers of components, the version numbers having been assigned using a scheme that conveys meaning about a component and what has been modified from one version to the next. Using this type of version number scheme is found to be particularly efficient.

Clause I The method of any preceding clause wherein the first graph comprises component A linked to component B linked to component C, and wherein the method comprises receiving an update to component C instructed by component A without an update to component B, where the update to component C is within a version range specified in component B as being compatible for component C. Efficiencies are gained since the intermediate component B is not updated.

Clause J The method of any preceding clause wherein the first graph comprises component A linked to component B linked to component C, and wherein the method comprises receiving an update to component B and component C instructed by component A, where the update to component C is outside a version range specified in component B as being compatible for component C. Accuracy is achieved since components are appropriately updated.

Clause K The method of any preceding clause comprising recording versions of components and dependencies of components used during the compiling. In this way an accurate record is obtained of a deployment.

Clause L The method of clause K comprising using the recorded versions of components and dependencies to check that the first component is compiled in the same way during a subsequent compilation of the first component. In this way a subsequent deployment of an application can be verified to be the same as an earlier deployment of the application.

Clause M The method of clause K comprising recording the versions in a format with a publicly available schema. Using containerized applications brings benefits of scalability and flexibility.

Clause N The method of any preceding clause comprising using the compiler to carry out one or more of the following operations in the first graph: dependency resolution, dependency updating, dependency tracking.

Clause O The method of any preceding clause comprising compiling the received component into second instructions for input to a second orchestrator different from the first orchestrator. The compiler thus gives the benefit that the components can be re used for different orchestrators thus enabling re use of components, reduced errors and improved efficiency.

Clause P An apparatus for deploying an application at a cluster of cloud nodes the apparatus comprising:
a memory storing a component defining the deployment of the application at the cluster of cloud nodes, the component recursively defining a first graph of other components,
where a component has a mapping from an interface of the component to an interface of any component referenced in the component; and
a compiler which compiles the received component into instructions for input to an orchestrator of the cluster of cloud nodes, and sends the instructions to the orchestrator to trigger deployment of the application.

Clause Q The apparatus of clause O wherein a component hides an interface of any component it references as a result of the mapping.

Clause R The apparatus of clause O or P wherein the memory stores a second component defining a deployment of a second application at the cluster of cloud nodes, the second component recursively defining a second graph which has one or more nodes in common with the first graph.

Clause S The apparatus of any of clauses O to Q wherein the compiler implements dependency resolution and/or dependency updating within the first graph.

Clause T One or more device-readable media with device-executable instructions that, when executed by a computing system, direct the computing system to perform operations comprising:
receiving a component defining a deployment of an application at a cluster of cloud nodes, the component recursively defining other components,
where a component has a mapping from an interface of the component to an interface of any component referenced in the component;
compiling the received component into instructions for input to an orchestrator of the cluster of cloud nodes; and
sending the instructions to the orchestrator to trigger deployment of the application.

A computer-implemented method for deploying an application in a computing environment comprising a plurality of computing devices configured to provide computing resources to end users, the method comprising:
accessing a component defining the deployment of the application at a cluster of the computing devices, the component recursively defining a first graph of other components,
wherein the component has a mapping from an interface of the component to an interface of other components referenced in the component;
compiling the component into instructions for input to an orchestrator of the cluster of computing devices; and
sending the instructions to the orchestrator to trigger deployment of the application.

A system comprising:
one or more processors; and
a memory in communication with the one or more processors, the memory having computer-readable instructions stored thereupon that, when executed by the one or more processors, cause the system to perform operations comprising:
accessing a component defining a deployment of an application in a computing environment comprising a plurality of computing devices, the component recursively defining a first graph of other components, wherein the component includes a mapping from an interface of the component to an interface of other components that are referenced in the component; and
causing the component to be compiled into instructions for input to an orchestrator of the plurality of computing devices; and
sending the instructions to the orchestrator to trigger deployment of the application.

The method, apparatus, or device-readable media of any of the above clauses, wherein expressions that are defined in terms of inputs to the root node of the graph are resolved into constant values based on stored mapping information that maps the constant values to respective root node inputs.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer implemented method for deploying an application at a cluster of cloud nodes the method comprising:

receiving a first compositional component defining the deployment of the application at the cluster of cloud nodes, the first compositional component recursively defining a first graph of other compositional components, wherein the first compositional component has a mapping from an interface of the first compositional component to an interface of the other compositional components as defined by the first graph, the mapping indicative of how input to the other compositional components is derived from the first compositional component's input;

compiling the first compositional component into instructions for input to an orchestrator of the cluster of cloud nodes, the orchestrator configured to receive the instructions via an interface and deploy applications in the cluster according to the instructions; and sending the instructions to the orchestrator to trigger deployment of the application.

2. The method of claim 1 wherein the first compositional component hides an interface of any compositional component it references as a result of the mapping.

3. The method of claim 1 comprising receiving a second compositional component defining a deployment of a second application at the cluster of cloud nodes, the second compositional component recursively defining a second graph which has one or more nodes in common with the first graph.

4. The method of claim 3 comprising compiling the second compositional component into deployment instructions for input to the orchestrator to deploy the second application.

5. The method of claim 1 comprising compiling the first compositional component by remapping unresolved expressions of the first graph in a recursive manner using the mappings, such that expressions are defined in terms of inputs to a root node of the graph.

6. The method of claim 5 comprising at a root node of the graph, identifying an unresolved expression of a compositional component corresponding to the root node, remapping the unresolved expression using a mapping of the compositional component corresponding to the root node, using the mapped inputs as inputs to a compositional component referenced by the root node and continuing to recursively remap through the graph until the unresolved expression is resolved in terms of inputs to the root node.

7. The method of claim 5 wherein the first compositional component comprises a range of compatible versions of a compositional component referenced by the first compositional component and wherein the compiler checks a version of the referenced compositional component used during remapping is within the range of compatible versions.

8. The method of claim 1 comprising using the compiler to carry out dependency resolution of dependencies in the first graph whereby the dependency is resolved by using version numbers of compositional components, the version numbers having been assigned using a scheme that conveys meaning about a compositional component and what has been modified from one version to the next.

9. The method of claim 1 wherein the first graph comprises compositional component A linked to compositional component B linked to compositional component C, and wherein the method comprises receiving an update to compositional component C instructed by compositional component A without an update to compositional component B, where the update to compositional component C is within a version range specified in compositional component B as being compatible for compositional component C.

10. The method of claim 1 wherein the first graph comprises compositional component A linked to compositional component B linked to compositional component C, and wherein the method comprises receiving an update to compositional component B and compositional component C instructed by compositional component A, where the update to compositional component C is outside a version range specified in compositional component B as being compatible for compositional component C.

11. The method of claim 1 comprising recording versions of compositional components and dependencies of compositional components used during the compiling.

12. The method of claim 11 comprising using the recorded versions of compositional components and dependencies to check that the first compositional component is compiled in the same way during a subsequent compilation of the first compositional component.

13. The method of claim 11 comprising recording the versions in a format with a publicly available schema.

14. The method of claim 1 comprising using the compiler to carry out one or more of the following operations in the first graph: dependency resolution, dependency updating, dependency tracking.

15. The method of claim 1 comprising compiling the received compositional component into second instructions for input to a second orchestrator different from the orchestrator.

16. A system comprising:
one or more processors; and
a memory in communication with the one or more processors, the memory having computer-readable instructions stored thereupon that, when executed by the one or more processors, cause the system to perform operations comprising:
accessing a component defining a deployment of an application in a computing environment comprising a plurality of computing devices, the component recursively defining a first graph of other components,
wherein the component includes a mapping from an interface of the component to an interface of other components referenced in the component; and
causing the component to be compiled into instructions for input to an orchestrator of the plurality of computing devices, and
sending the instructions to the orchestrator to trigger deployment of the application.

17. The system of claim 16 wherein a component hides an interface of any component it references as a result of the mapping.

18. The system of claim 16 wherein the memory stores a second component defining a deployment of a second application at the plurality of computing devices, the second component recursively defining a second graph which has one or more nodes in common with the first graph.

19. The system of claim 16 wherein the compiler implements any of dependency resolution and dependency updating within the first graph.

20. One or more non-transitory device-readable media with device-executable instructions that, when executed by a computing system, direct the computing system to perform operations comprising:
receiving a Kubernetes component defining a deployment of an application at a cluster of cloud nodes, the Kubernetes component recursively defining other Kubernetes components,
wherein the Kubernetes component has a mapping from an interface of the Kubernetes component to an interface of any other Kubernetes component referenced in the Kubernetes component;
compiling the received Kubernetes component into instructions for input to an orchestrator of the cluster of cloud nodes; and
sending the instructions to the orchestrator to trigger deployment of the application.

\* \* \* \* \*